United States Patent

[11] 3,612,387

[72] Inventor Robert R. Rathbun
Middletown, Ohio
[21] Appl. No. 1,234
[22] Filed Jan. 7, 1970
[45] Patented Oct. 12, 1971
[73] Assignee Aeronca, Inc.
Middletown, Ohio

[54] BRAZING METHOD AND APPARATUS
10 Claims, 10 Drawing Figs.
[52] U.S. Cl. .................................................. 228/6,
228/44, 228/49, 269/22
[51] Int. Cl. ...................................... B23k 5/00,
B23k 1/00
[50] Field of Search ................................ 228/4, 6,
44, 47, 49; 269/22

[56] References Cited
UNITED STATES PATENTS
| | | | |
|---|---|---|---|
| 2,693,636 | 11/1954 | Simpelaar ..................... | 228/44 X |
| 3,112,388 | 11/1963 | Wiant ........................... | 228/44 |
| 3,465,116 | 9/1969 | Dix ................................ | 228/4 X |
| 2,685,629 | 8/1954 | Peck .............................. | 269/22 X |
| 3,011,926 | 12/1961 | Rowe ............................ | 228/44 |
| 3,093,104 | 6/1963 | Bukata .......................... | 228/44 |
| 3,412,917 | 11/1968 | Omley ........................... | 228/44 |
| 3,433,699 | 3/1969 | Rumble ......................... | 269/22 X |

Primary Examiner—John F. Campbell
Assistant Examiner—Richard Bernard Lazarus
Attorney—Wood, Herron and Evans ABSTRACT: A method and apparatus are disclosed for brazing articles such as honeycomb sandwich structures. The apparatus includes a cold wall boxlike housing separable into upper and lower sections. Each section carries a ceramic die member provided with passageways terminating in small ports for conducting a cooling fluid adjacent to the work. The workpiece is heated by electrical resistance heater strips passing above and below the workpiece. Means are provided for evacuating the housing and backfilling it with argon. When the workpiece is brought to brazing temperature, two expandable bags are inflated. One bag raises the lower die section to form a general fit with the upper one. The second bag is in direct contact with the upper face of the workpiece and exerts a uniform pressure normal to its surface. After brazing, the bags are deflated and chilled argon is introduced through the die passages to cool the work. Other features include localized temperature control by electron emission or cooling tubes and vapor removal by means of a cold trap.

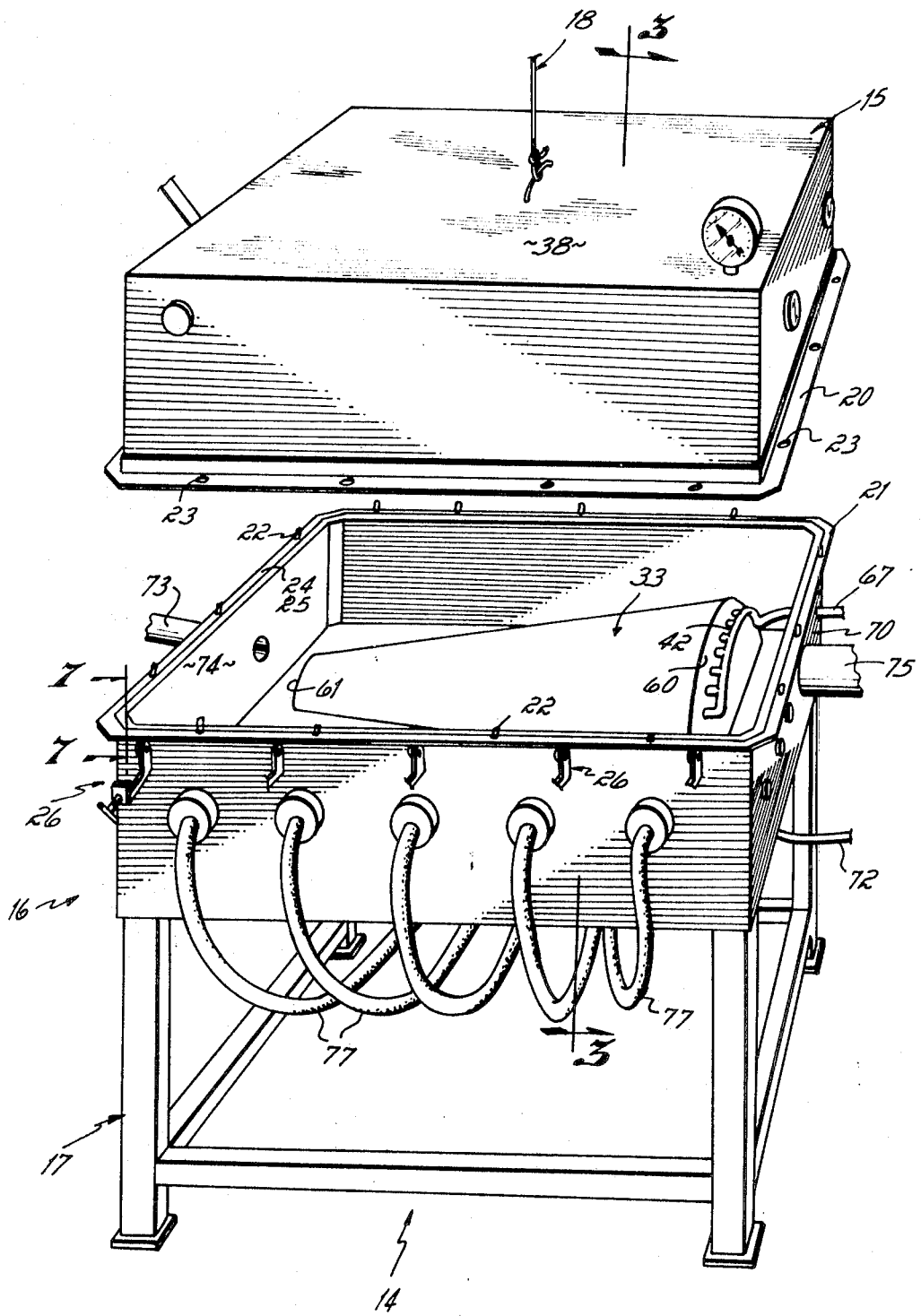

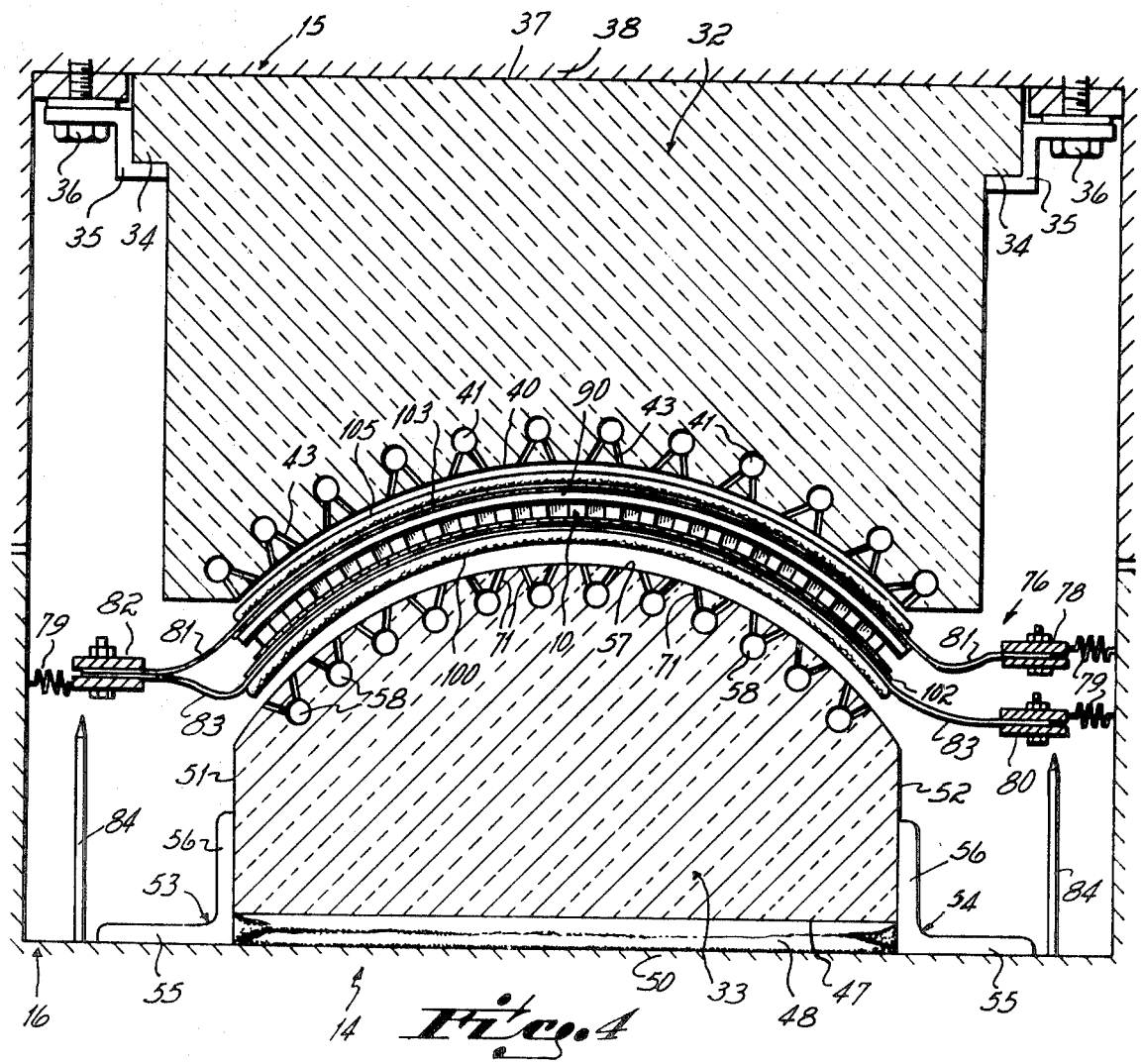
FIG. 4
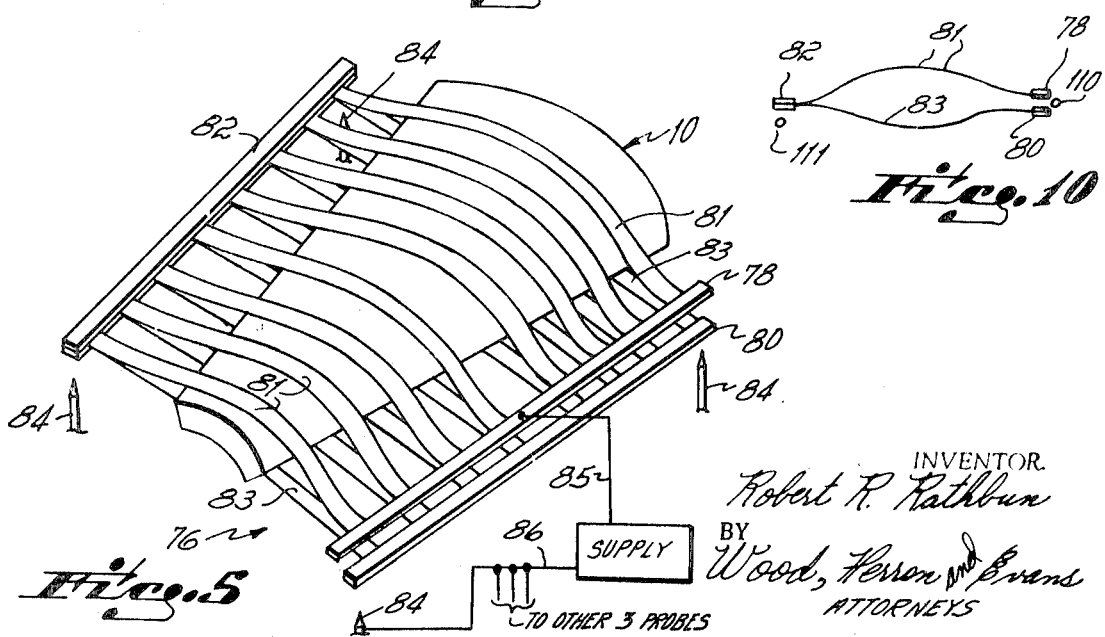
FIG. 5
FIG. 10
INVENTOR.
Robert R. Rathbun
BY
Wood, Herron and Evans
ATTORNEYS

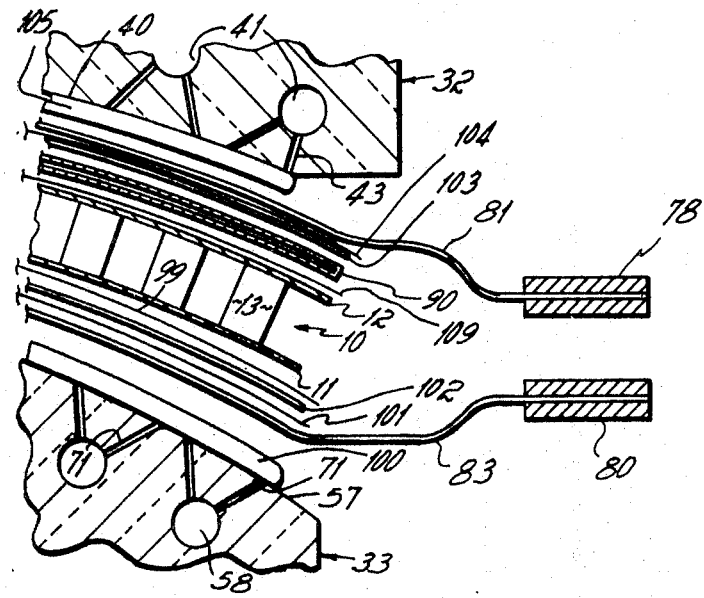
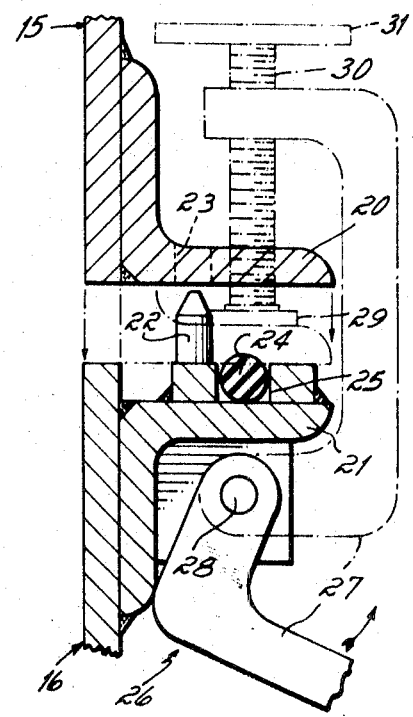
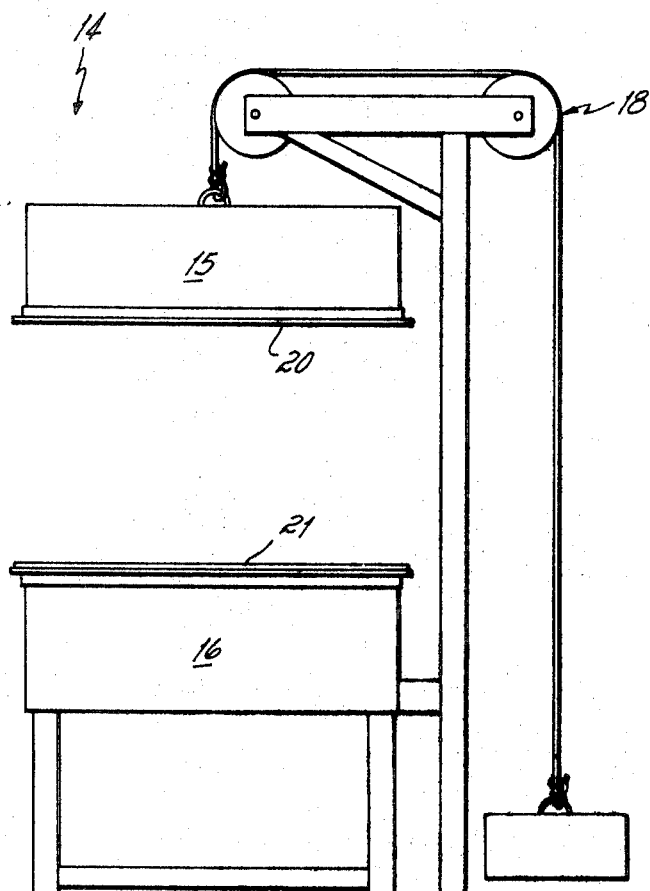
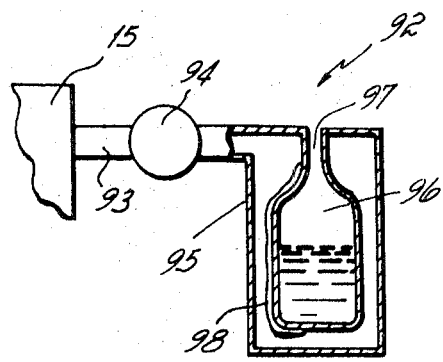

BRAZING METHOD AND APPARATUS

BACKGROUND OF THE INVENTION

This invention relates to a new and improved method and apparatus of brazing composite honeycomb core panels.

The present invention is particularly useful in connection with the brazing of stainless steel honeycomb panels of the type utilized in the construction of supersonic speed aircraft, space vehicles and the like. Panels of this type are subjected to high temperature during use and, accordingly, are formed from stainless steel surface sheets brazed to the opposite sides of a center honeycomb core formed of stainless steel. These panels are manufactured to meet high structural requirements with the result that the brazed joints must be substantially flawless.

In the past, many different techniques have been proposed for fabricating honeycomb panels of this type. Those techniques which have been practical enough to produce the high quality panels required have been very expensive and time consuming.

Accordingly, it is the principal object of the present invention to provide a new method and apparatus for brazing honeycomb sandwich structures at a substantial reduction in cost and in substantially less time than was possible with previous methods. The utilization of the present method and apparatus also facilitates the production of superior honeycomb structural members having improved brazed joints and surface characteristics, e.g. lack of wrinkling and the like.

More particularly, the brazing apparatus of the present invention includes a two-piece, boxlike cold wall enclosure. The enclosure consists of upper and lower sections with mating peripheral flanges. During a brazing operation the sections are clamped together and an airtight joint is formed by an O-ring carried by one of the flanges and compressed into sealed relationship with the opposite flange. Each housing section carries a cast stable die member preferably formed of a suitable ceramic, such as Glasrock or the like. Means are provided for raising the upper housing member and its die an appreciable distance above the lower housing member so that easy access is provided to both die members and the interior of the housing. This greatly facilitates set up of the tool and loading and unloading of the honeycomb panel being brazed.

Each die member has a working face and a plurality of internal coolant passages which communicate with the face through a plurality of small ports. The coolant passages of each die are interconnected through a manifold to a cooling gas line. In the preferred embodiment the lower die is shiftable within the housing toward and away from the upper die. These movements are effected be means of an inflatable bag mounted beneath the lower die between that die and the bottom wall of the lower housing.

The workpiece is heated by means of electrical resistance heater strips which extend transversely between the workpiece and the upper and lower die members respectively. A second pressure bag is disposed between the upper heater strips and the upper surface of the sandwich structure. This upper bag conforms itself to the configuration of the upper die and when inflated is effective to apply a substantially uniform pressure normal to the surface of the sandwich structure no matter whether that surface is planar or curved.

The apparatus also includes a connection to a vacuum pump and a connection to a source of inert gas, such as argon. Although it is preferable to carry out the brazing operation in an inert atmosphere, such as argon, the present apparatus can also be utilized to carry out a brazing operation under a hard vacuum. In accordance with one aspect of the present invention, the amount of moisture within the enclosure is minimized by means of a cold strap which communicates with the housing and includes an airtight chamber at least one wall of which is common with a well containing a cold material, such as liquid nitrogen. The gas within the tank is circulated through the chamber where water vapor is condensed and freezes on the cold wall. This vapor is thus held away from the sandwich material being brazed.

One of the principal advantages of this apparatus is that it facilitates the utilization of a very rapid brazing cycle. For example, in a typical brazing operation the brazing apparatus can be loaded in approximately 15 minutes. The enclosure can be purged and back-filled with an inert gas and the part brought up to brazing temperature in 1 hour. Thereafter, the brazed part can be directly cooled in 1 hour by introducing a cooling gas, such as chilled argon, through the apertures in the die. This 2-hour cycle is approximately one-seventh the length of time required in a conventional brazing operation. Moreover, the savings in labor and expendable materials can run as high as 74 percent for a given part.

In accordance with the present brazing method, the sandwich structure to be brazed is placed over the lower die member. This die member has previously been covered with an insulating blanket, resistance heater strips and other conventional elements, such as slip sheets and the like. A slip sheet and inflatable bag are placed above the sandwich member and are then covered with resistance heating strips, an insulating sheet and blanket. The upper housing member is then lowered and clamped to the lower housing member to form an airtight closure around the dies. Both the upper bag above the sandwich and the lower bag below the lower die are evacuated. The enclosure itself is then evacuated and back-filled with argon. This may be repeated one or more times.

In the preferred method, after the final back-filling of argon to a pressure of the order of 5" of mercury, the temperature and the workpiece are raised by the resistance heaters to brazing temperature. The lower bag is then inflated to raise the lower die. This causes the die members and workpiece to seat relative to one another. Thereafter, the upper bag is inflated to apply a uniform brazing force normal to the surface of the sandwich structure.

After the brazing has been completed, the electrical resistance heaters are deenergized and the pressure bags are again evacuated. A cooling gas, such as chilled argon, is introduced through the passageways in the dies. The cooling gas issuing from the bottom die is effective to lift the core from the bottom die st that the core in effect is suspended and immersed in a stream of cooling gas. After the core temperature has been reduced the desired amount, the top housing section and its attached die member are raised and the brazed structure is withdrawn.

In addition to the economics provided, this method is advantageous in that it results in the production of a superior brazed panel member. In the first place, the rapid elevation of the sandwich member to brazing temperature and rapid cooling thereafter minimizes any tendency of the brazing alloy to migrate or separate. Secondly, the sandwich structure is not subjected to any appreciable pressure during the time when it is being brought up to brazing temperature. Thus, the skin is kept smooth and free from wrinkles. Moreover, the brazed joint is uniform since the parts have been subjected to a uniform pressure across their entire surface.

Moreover, in accordance with another aspect of the present invention, the brazed joint is also made uniform because the temperature across the honeycomb structure is kept substantially uniform. In accordance with the present invention, this uniform temperature is maintained by effecting a local cooling adjacent to one or both edges of the honeycomb structure which would otherwise develop hot spots. This local cooling action is obtained either by causing an emission of electrons from the electrical heating means in this area or by causing radiation of heat from the electrical heating means in this area to a sink in the form of a tube through which cooling water is fed when cooling is required.

In accordance with a further aspect of the present method, a sandwich structure can be creep formed simultaneously with the brazing operation. More particularly, a sandwich structure which is to be given a curved configuration is not completely preformed prior to the brazing operation, but is either inserted between the dies in a planar condition or in only a partially curved condition. The pressure exerted upon the structure when it is at the brazing temperature by the upper pressure bag not only causes the formation of a braze joint, but also bends the sandwich into its final shape conforming to that of the die faces.

These and other objects and advantages of the present invention will be more readily apparent from a consideration of the following detailed description of the drawings illustrating the manner in which the present process is carried out and a preferred form of apparatus for practicing the process.

DESCRIPTION OF THE DRAWINGS

In the drawings:

FIG. 2 is a perspective view of a preferred form of brazing apparatus for carrying out the present brazing method.

FIG. 4 is a cross-sectional view similar to FIG. 3 with the lower bag deflated.

FIG. 5 is a semidiagrammatic perspective view of one form of core heating and temperature control unit.

FIG. 6 is an enlarged, generally diagrammatic, partially exploded, cross-sectional view taken through the upper and lower die members, the sandwich panel being fabricated, and the heater strips.

FIG. 7 is a cross-sectional view taken along line 7—7 of FIG. 2 showing a clamp for securing the upper and lower housing members together.

FIG. 8 is a diagrammatic view of a vapor trap utilized in connection with the present brazing apparatus.

FIG. 9 is an end view of one form of brazing apparatus constructed in accordance with the present invention.

FIG. 10 is a diagrammatic view illustrating a modified form of a temperature control.

APPARATUS

Figure 1:
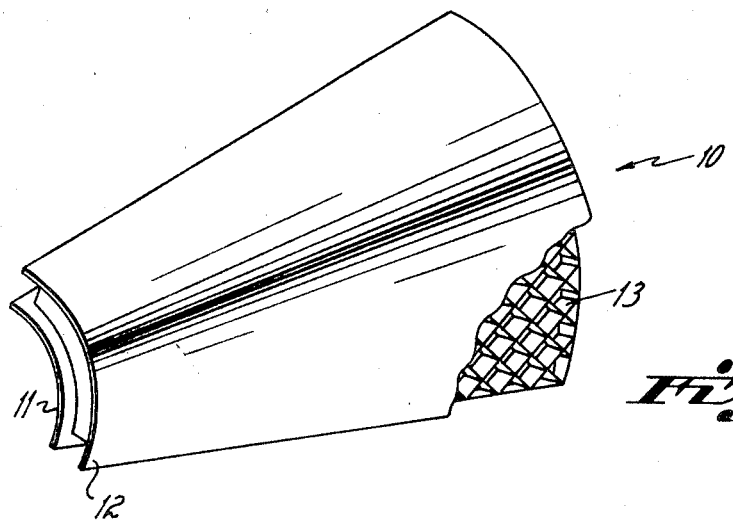
FIG. 1 is a perspective view, partially broken away, of a typical honeycomb core member fabricated in accordance with the principles of the present invention.

The present apparatus is particularly useful in the fabrication of honeycomb sandwich structures. One such honeycomb sandwich panel 10 is shown in FIG. 1. This panel comprises two outer skin sheets, or faces, 11 and 12 and an inner honeycomb core 13. The skins, or faces, 11 and 12 in a typical structure are formed from sheets such as stainless steel or Inconel. The honeycomb core is likewise formed from a thin metal foil of the order of, for example, 0.002 inch thick.

The core is preformed using any suitable technique, such as spot welding together adjacent corrugated strips along their abutting nodal portions. The honeycomb core and panels are joined together by a suitable braze alloy comprising, for example, 23 percent manganese, 4 percent copper, 2 percent silicon and 71 percent nickel. The braze compound can be applied to the exposed edges of the honeycomb core in any suitable manner, such as by dipping the core in a braze powder, by spraying the core with a powder, or by utilizing the braze alloy in the form of a thin sheet interposed between the core and skin sheets. It is to be understood that whole the present method can be utilized to great advantage in the brazing of compound curved panels, such as the panel shown in FIG. 1, it can also be used in the fabrication of simply curved panels or planar panels.

Figure 3:
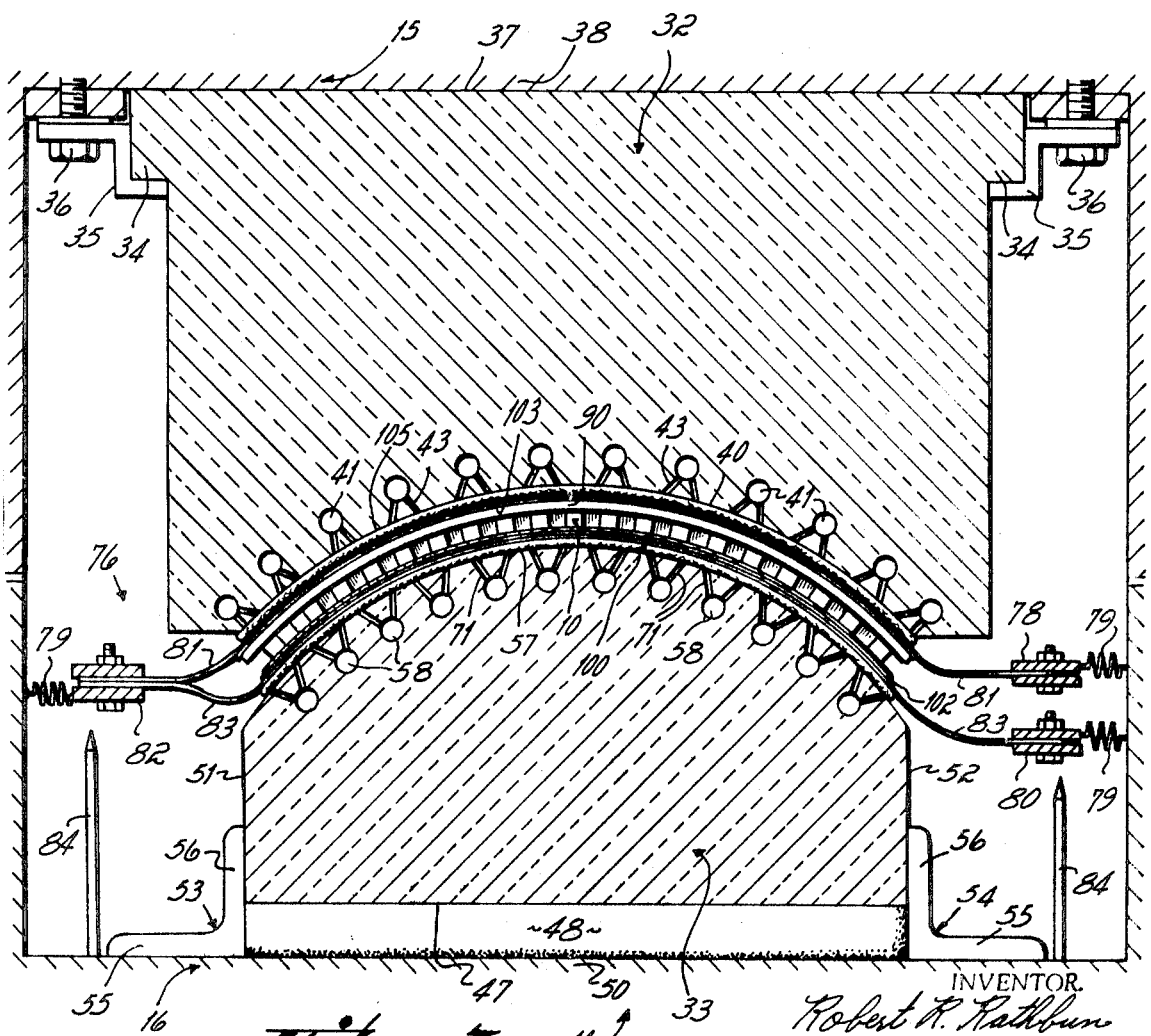
FIG. 3 is a transverse cross-sectional view of the brazing apparatus with the top in a lowered position. The view is taken generally along line 3—3 OF FIG. 2 (except that the top is lowered and the lower bag is inflated).

The overall construction of the brazing apparatus 14 is best shown in FIGS. 2, 3 and 9. As there shown, the brazing apparatus 14 comprises a cold wall, boxlike, airtight exterior housing consisting of upper section 15 and lower section 16. Lower housing member 16 is stationary and is mounted upon a suitable base 17. The upper housing is adapted to be raised and lowered relative to the lower housing member 16 by any suitable form of elevating mechanism, such as the counterweight, rope and pulley arrangement 18 shown diagrammatically in FIG. 9.

When upper housing 15 is in its elevated or storage position as indicated in FIG. 9, it is spaced an appreciable distance from lower housing 16, allowing ready access to the elements disposed within both the upper and lower housing sections. In its operative position, however, the upper housing is lowered into sealed engagement with lower housing 16. This sealed engagement is provided by outwardly extending peripheral flanges 20 and 21 formed upon the upper and lower housing members 15 and 16 respectively.

As is best shown in FIG. 7, the housings are brought into precise alignment by the interengagement of upstanding locating pins 22 carried by lower flange 21 and aligned openings 23 formed in upper flange 20. The lower flange also carries an O-ring 24 which extends completely around the flange in a peripheral channel 25. When the upper flange 20 is clamped against the channel 25 of lower flange 21 as indicated by the dotted lines in FIG. 7, O-ring 24 is compressed to provide a completely airtight seal around the entire periphery of the mating upper and lower flanges 20 and 21.

The clamping force for holding the upper and lower housings together is provided by a series of clamp mechanisms 26 as shown in FIGS. 2 and 7. Each clamp mechanism comprises a generally C-shaped clamp arm 27 pivotally mounted on a pivot pin 28 beneath lower flange 21. The upper end of the C-clamp carries a clamp screw 30 having a handle 31 and a clamp foot 29 adapted to press against the upper flange 20 to force that flange into tight engagement with the lower flange 21.

The upper and lower housing members 15 and 16 each respectively carry ceramic die members 32 and 33. These die members are preferably formed of a suitable dimensionally stable ceramic material, such as Glasrock. In accordance with the present invention, the die members are movable relative to one another within the confines of the outer housing members 15 and 16.

More particularly, in the specific embodiment shown, upper die member 32 is rigidly mounted within upper housing member 15. As shown in FIG. 3, upper die member 32 includes upper, outwardly extending side flanges 34 which are engaged by Z-shaped angle members 35. These angle members are bolted to the upper portion of housing member 15 as by means of bolts 36 so that the upper surface 37 of the die member 32 is rigidly clamped in place against the top wall 38 of housing member 15.

Upper die member 32 includes a lower wording face 40 having the contour of the upper surface of the sandwich section 10 being fabricated. The upper die section is further provided with a plurality of longitudinally extending coolant fluid passageways 41 adapted to be connected to an upper manifold and supply tube (not shown), but generally like the lower manifold 42 and tube 67 shown in FIG. 2. Bores 41 extend from one end of the upper die member to substantially the opposite end of the die member. Each of these passageways is connected to a plurality of small ports 43 which extend from the core to the working face 40 of the die. In the embodiment shown, this face is smooth. However, in some embodiments the face 40 can be provided with a network of longitudinal and transverse grooves. In this case, the ports 43 communicate with the grooves (not shown).

The lower die member 33 is mounted for limited vertical movement within lower housing member 16. More particularly, die member 33 includes a horizontal bottom wall 47 which is disposed in engagement with an inflatable bag 48 disposed between bottom surface 47 of the die member and bottom wall 50 of the lower housing member 16. Lower die member 33 also includes two opposed vertical sidewalls 51 and 52. These walls are constrained against lateral movement by means of stationary guide members 53 and 54. Each of the guide members as shown is in the form of an angle member having a bottom arm 55 welded or otherwise secured to the bottom wall 50 of the housing member and upwardly extending arm 56 in engagement with one of the vertical walls 51 and 52 of the die member. Similar guide members (not shown) are provided for constraining endwise movement of the lower die member.

Lower member 33 includes an arcuate working face 57 conforming to the configuration of the lower surface of braze composite 10, Die member 33 also is provided with a plurality of longitudinally extending coolant passages 58. These passages extend from one end wall 60 of the lower die adjacent to the opposite end wall 61 of the die. A connection is made to the coolant passages from a manifold 42. This manifold is joined to a tube 67 which extends through a sidewall 70 of lower housing section 16.

Passages 58 interconnect with a plurality of small bores 71. These bores extend through to the working face 57 of the lower die member which, in the embodiment shown, is smooth but which alternatively may be provided with a plurality of longitudinal and transverse grooves for distributing the coolant over the face of the working die.

As indicated above, lower die member 33 is adapted for vertical movement relative to the bottom wall 50 of the housing. This movement is effected by means of an inflatable bag member, or bladder, 48. In one preferred embodiment, bladder 48 is formed of neoprene-coated dacron fabric. Alternatively, this bladder can be fabricated from a thin flexible material, such as 321 stainless steel of a thickness of approximately 0.015 inch. Bag 48 is connected to a line 72 which extends from outside of the lower housing through a wall of the housing as shown in FIG. 2.

In addition to these elements, the present tool includes a connection of an argon back-fill line 73 which communicates with the interior of the housing through sidewalls 74 (FIG. 2). A vacuum line 75 is connected to the housing through sidewall 70. It is to be understood that these and all other connections through the walls of housing sections 15 and 16 are airtight.

Another major component of the brazing apparatus is the electrical heating and temperature control system 76. Essentially, the electrical heating system comprises a plurality of power cables 77 which are connected to bus bars 78 and 80. Bus bar 78 is actually a two-piece clamp bar which is effective to clamp the ends of a plurality of heater strips 81.

These heater strips are formed of a suitable resistance heating material, such as 0.012 inch chromel metal. The strips extend transversely of the die assembly generally parallel to one another. At the opposite side of the die assembly the strips are joined to another bus bar 82. This second bus bar 82 is also secured to a plurality of lower heating strips 83 which are similar to the first set of strips and which pass beneath the lower portion of the assembly 10 being fabricated and the lower die section. These lower strips 83 are clamped to lower bus bar 80. It is to be understood that bus bars 78, 80 and 82 are preferably carried by tension springs 79 mounted on the sidewalls of housing member 16 in a conventional manner. Suitable electrical insulation is maintained.

It is to be understood that the power supply system for the electrical heating elements is provided with conventional controls for regulating the temperature developed by the resistance heating elements. However, in some cases it develops that the temperature is not uniform across the piece being brazed. Accordingly, one aspect of the present invention contemplates the provision of means for selectively lowering the temperature at one or more edge portions of the braze assembly.

In brazing pieces of the type shown in FIG. 5, it has been empirically determined that hot spots tend to develop adjacent to the edges of the pieces. As shown in FIG. 5, these edges are adapted to be selectively cooled by means of an electron emission cooling circuit. It is to be understood that thermocouples (not shown) are disposed at a plurality of points adjacent to the working faces of the die members so that the temperature of every area of the sandwich structure can be monitored continuously.

As shown in FIG. 5, a plurality of probes 84 are permanently mounted within lower housing 16 and are electrically insulated therefrom. The probes are spaced closely adjacent to one or the other of the bus bars 78, 80 and 82. The probes are connected to a high voltage source of direct current, for example, a source of the order of 20–50 kv. The positive lines 85 of this source is connected to the bus bar 78 while the negative leads 86 are connected to the probes 84 as indicated diagrammatically in FIG. 5. When it is desired to cool one or more of the localized areas adjacent to one of the probes, the circuit is completed to that probe from the high voltage AC supply. As a result, electrons are emitted from the bus bar adjacent to the probe. This results in a loss of energy in that portion of the bus bar and manifests itself as a reduction in temperature. The temperature of the adjacent area of the workpiece being brazed is lowered by conduction through the adjacent heater strips to the cool spot on the bus bar.

A modified form of local cooling means is shown diagrammatically in FIG. 10. As there shown, two tubes 110 and 111 extend parallel to bus bars 78 and 82 respectively. These tubes are connected through suitable valves to a source of water. When it is desired to cool one side or the other of the honeycomb sandwich structure, water is introduced into the tubes. The water flow maintains the temperature of the tubes at a relatively low level so that heat radiates from the adjacent bus bar to the tube. This reduces the temperature of the adjacent edge of the sandwich structure by an amount sufficient to reestablish a substantially uniform temperature across the sandwich.

In addition to these elements, the present brazing apparatus includes an upper, or hot, bladder 90 (see FIGS. 3, 4 and 6). This bladder is disposed between the upper die member and the upper skin 12 of the workpiece. The bladder is fabricated from thin sheets of stainless steel, or a similar heat resistant material, the thickness of the bladder sheets preferably being from 0.015 inch to 0.025". The two sheets comprising the bladder are welded around the entire periphery to form an airtight member. A connection is made from the bladder to an inlet line which passes through the top wall of housing section 15 and communicates with the interior of the bladder. In the present embodiment, bladder 90 is preferably fabricated so that its exterior dimensions correspond very closely to the exterior dimensions of the panel.

Another component of the present brazing apparatus is shown in FIG. 8. As there shown, a vapor trap assembly 92 communicates with one corner of housing member 15. The vapor trap assembly includes a line 93 which opens through a suitable port in the housing and communicates with a valve 94. The opposite side of valve 94 is connected to an airtight chamber 95. Chamber 95 is a cold chamber which includes a hollow internal well 96. This well Process open at the top and is connected to the external wall of the chamber 95 through a narrow neck portion 97 which functions to minimize the heat losses. The chamber is filled with an extremely cold material such as liquid nitrogen. The temperature of this material is so low that when valve 94 is opened and air circulates form the interior of the housing to the cold chamber, any water vapor condenses out of the atmosphere and freezes on the exterior surface of well 96. This is shown diagrammatically by the frozen vapor patch 98 in FIG. 8.

PROCESS

In brazing parts utilizing the present method and apparatus, the first step is the fabrication of the upper and lower die forms 32 and 33. The working faces of these die forms are shaped and the longitudinal fluid passageways and ports are formed using conventional techniques. Then upper die section 32 is mounted in upper housing 15 and lower die section 33 is mounted in lower housing section 16. Next, a pad of insulating cloth 100, such as a three-quarter inch blanket of Kaowool material, is placed over the working face of lower die member 33. Then, the lower resistance heater strips 83 are secured to clamp bars 82 and 80 and are laid over the Kaowool blanket. An insulating sheet 101 formed of fibrous silica, or the like, is laid over the top of the heating strips 83. A heat distributing sheet of copper, or the like, 102 is placed over the top of the insulating sheet 101, and a slip sheet 99 of stainless steel is laid over the copper sheet.

Next, the sandwich assembly 10 is placed over slip sheet 99. It is to be understood that the core and two sandwich sheets 10 and 12 are temporarily adhered together by any suitable means, such as tack brazing or tack welding. After the sandwich assembly 10 is in place, a slip sheet 109 is placed over it and bag 90 is placed over the slip sheet. It is to be understood that the bag is not pressurized at this time. Thereafter, a copper sheet 103 is placed on top of the bag and is covered by an insulating sheet of silica fibers 104. Thereafter, the upper heating strips 81 are laid over the top of the insulating sheet and are secured to clamp bars 82 and 78. The upper surfaces of the heating strips are covered by a second insulating blanket 105 formed of Kaowool or the like.

Following this procedure, the upper housing member 15 is lowered into contact with lower housing member 16. The clamps 26 are tightened down to compress O-ring 24 and establish a peripheral seal at a juncture of the upper and lower housing members.

In the next step, bags 90 and 48 are evacuated and the interior of the housing is evacuated by means of a vacuum pump connected to line 75. Following evacuation of the housing, the interior of the housing is back-filled with argon through feed line 73. This process of drawing a vacuum and back-filling can be repeated a number of times if desired. The function of the argon back-filling is to assist in flushing out the oxygen and water vapor in particular and in replacing it on the surface of all materials inside the braze tool. During this vacuum argon back-filling cycle, power is applied to the heating elements 81 and 83 to bring the temperature of the assembly to be brazed to approximately 500° to thereby facilitate exchange of undesirable gas with argon as a surface layer. Following the purging the interior of the housing is filled with argon to its normal working pressure of 5" of mercury. This pressure is accurately maintained by continuously supplying a small quantity of argon through line 73 while withdrawing a similar quantity of gas through vacuum line 75.

It is to be understood that during this time both upper bag 90 and lower bag 48 are held under vacuum. Thus, there is only a nominal force applied to the assembly being brazed and there is no constriction to cause wrinkling, i.e. the material can seek its proper position without wrinkling during the expansion phase.

After the interior of the housing has been placed under its operating pressure, the of the part to be brazed is raised to brazing temperature, normally a temperature of the order of 1950° F. The total time required for the purging and back-filling operation and to bring the part up to braze temperature is o of the order of one hour. As the work reaches brazing temperature, a pressure is applied to the interior of lower bag 48. This bag raises lower die member 33 and causes the part being brazed to generally accommodate itself to the working surfaces of the lower and upper die.

Pressure is then applied to upper bag 90, This pressure of from ½ to 3 p.s.i. results in a brazing force being applied normal to the surface of the part being brazed and of substantially equal magnitude over the entire surface.

After the core has been held at brazing temperature a sufficient length of time to effect a brazing operation, the upper and lower bags are evacuated. This causes the lower die section 33 to be lowered. At the same time, prechilled argon is fed to the manifolds associated with the upper and lower die sections. This cold argon flows through the longitudinal passageways formed in each die member and escapes through the ports 43 and 71. The upper and lower die sections are thus separated and the cooling gas is forced through the many ports against the undersurface of copper sheet 101 and the upper surface of sheet 103. This causes brazed member 10 to be lifted off the lower tool and, in effect, causes it to float essentially between layers of coolant gas.

As a result of this action, the part is cooled rapidly, for example, from a brazing temperature of 1950° F. to a temperature of 650° F. in one hour. Thus, the total tool operating time from the point at which upper and lower sections 15 and 16 are closed to the time that the part is cooled to handling temperature is a total of 2 hours. The part is readily unloaded by merely disconnecting the upper clamp bus bar 78.

It has been determined that parts brazed in accordance with this method are superior to parts brazed by conventional techniques in that they are less susceptible to wrinkling or distortion, and, moreover, are possessed of a good, substantially uniform brazed joint.

In a modification of the precess described above, a honeycomb core sandwich structure can be shaped to a final simple or compound curved configuration at the same time that the structure is brazed. More particularly, in practicing this modified process, the core and skin sheets constituting the panel assembly are tacked together either in a planar configuration or in a lesser curvature than that of the final configuration. This panel assembly is placed on the lower die and is brazed in accordance with the process described above. In this case, however, when the final pressure is applied to the panel by upper bag member 90 after the panel has been raised to brazing temperature, the panel is not only brazed but undergoes hot creep forming which causes the panel to be shaped to its final configuration.

From the above description of the general principles of the present invention and the detailed disclosure of one preferred form of method and one preferred form of apparatus, those skilled in the art will readily comprehend various modifications to which the present invention is susceptible. Therefore, I desire to be limited only by the scope of the following claims.

Having described my invention, I claim:

1. Apparatus for brazing a composite sandwich member, said apparatus comprising:
   an upper boxlike housing section,
   a lower boxlike housing section, each of said sections having a peripheral flange,
   means for raising and lowering said upper housing relative to said lower housing,
   said flanges on the upper and lower housings being disposed in engagement with one another when said upper housing member is lowered into contact with said lower housing member,
   clamping means for holding said flanges in sealing airtight relationship,
   a first die member mounted within and carried by said upper housing section,
   a second die member mounted within said lower housing section, said first and second die members having opposed working faces,
   each of said die members further including a plurality of internal passageways and interconnecting ports opening on said work face,
   one of said die sections being movable mounted within its associated housing section for movement toward the opposite die member,
   a first expandable bag member interposed between said die member and a wall of said associated housing section for effecting movement of said die member toward the opposite die member,
   resistance heating elements interposed between each of said die members and said composite sandwich member,
   means for evacuating the interior of said housing sections,
   means for introducing an inert gas into said housing sections,
   means for introducing a coolant fluid into said passageways in each of said die sections,
   and means for selectively evacuating and pressurizing said expandable bag member.

2. The apparatus of claim 1 further comprising a second expandable bag member interposed between one of said die sections and the sandwich being brazed, said second bag member assuming a configuration conforming to the adjacent die face, and means for selectively evacuating and pressurizing said bag member.

3. The apparatus of claim 1 further comprising a cold trap having an airtight chamber in communication with the interior of said housing sections and a well adapted to contain a cooling medium.

4. The apparatus of claim 1 in which said upper die member is rigidly mounted within said upper die section and said lower die member is movable mounted relative to said lower die section,
guide means mounted within the lower section for restricting movements of said lower die member to movements in a vertical direction,
said first expandable bag member being interposed between said lower die member and the bottom wall of said lower housing section.

5. Apparatus of claim 1 further comprising a second expandable bag interposed between the upper die and the sandwich member being brazed, said second expandable bag having the configuration of the working face of the upper die member.

6. Apparatus of claim 4 further comprising a second expandable bag interposed between the upper die and the sandwich member being brazed, said second expandable bag having the configuration of the working face of the upper die member.

7. The apparatus of claim 1 in which each of said passageways extends longitudinally of said die member substantially the length thereof, a manifold interconnected to each of said passageways, each of said ports extending transversely from said passageways to the working face of the die.

8. Apparatus of claim 1 further comprising means for effecting localized cooling of the edges of said sandwich member being brazed.

9. Apparatus of claim 7 in which said means comprise a probe disposed adjacent to said resistance heating elements at the side of the member being brazed, a source of high DC potential, means connecting said source of potential so that said probe is negative relative to said resistance heating means and electrons are emitted from said resistance beating means to said probe to lower the temperature of the resistance heating elements in the area of said emission.

10. The apparatus of claim 8 in which said means comprise tubes adapted to carry cooling water disposed adjacent to said resistance heating elements at the side of said sandwich member being brazed.